(12) United States Patent
Peng (10) Patent No.: US 11,846,996 B2
(45) Date of Patent: Dec. 19, 2023

(54) ROTATING MECHANISM AND ELECTRONIC DEVICE INCLUDING THE SAME

(71) Applicant: GETAC HOLDINGS CORPORATION, New Taipei (TW)

(72) Inventor: Cheng-Shih Peng, Taipei (TW)

(73) Assignee: GETAC HOLDINGS CORPORATION, New Taipei (TW)

( * ) Notice: Subject to any disclaimer, the term of this patent is extended or adjusted under 35 U.S.C. 154(b) by 625 days.

(21) Appl. No.: 17/026,664

(22) Filed: Sep. 21, 2020

(65) Prior Publication Data

US 2022/0090727 A1 Mar. 24, 2022

(51) Int. Cl.
*G06F 1/16* (2006.01)
*H04M 1/02* (2006.01)
*F16M 11/06* (2006.01)

(52) U.S. Cl.
CPC .......... *G06F 1/1681* (2013.01); *G06F 1/1622* (2013.01); *G06F 1/1675* (2013.01); *H04M 1/0227* (2013.01); *F16M 11/06* (2013.01)

(58) Field of Classification Search
CPC ...... G06F 1/162; G06F 1/1622; G06F 1/1681; G06F 1/1675; F16M 11/06; F16M 11/12; H04M 1/0227
See application file for complete search history.

(56) References Cited

U.S. PATENT DOCUMENTS

| 2004/0139578 A1* | 7/2004 | Yang | G06F 1/162 16/337 |
| 2004/0151411 A1* | 8/2004 | Chang | G06F 1/162 384/247 |
| 2004/0160733 A1* | 8/2004 | Hsu | G06F 1/162 361/679.06 |

(Continued)

FOREIGN PATENT DOCUMENTS

| CN | 201496730 U | * | 6/2010 |
| CN | 201496730 U |   | 6/2010 |

OTHER PUBLICATIONS

China Patent Office, "Office Action", China, dated Jul. 1, 2022.
China Patent Office, "Office Action", China, dated Dec. 16, 2022.

*Primary Examiner* — Nidhi Thaker
(74) *Attorney, Agent, or Firm* — Locke Lord LLP; Tim Tingkang Xia, Esq.

(57) ABSTRACT

A rotating mechanism includes a first mount having a shaft hole, a second mount having a mounting part and a shaft part, a first engagement component, and a positioning assembly having a first positioning structure and a second positioning structure. The shaft part passes through the shaft hole so that the second mount is rotatable relative to the first mount. The first engagement component is fixed to the second mount and located on one side of the first mount away from the mounting part of the second mount, so that the first engagement component rotates relative to the first mount along with the second mount. The first positioning structure disposed on the first mount and the second posi- (Continued)

tioning structure disposed on the first engagement component are matching recess and protrusion that are engaged with each other so as to position the first mount and the second mount.

20 Claims, 5 Drawing Sheets

(56) References Cited

U.S. PATENT DOCUMENTS

| | | | | |
|---|---|---|---|---|
| 2005/0246741 | A1* | 11/2005 | Liu | G06F 1/1679 |
| | | | | 725/50 |
| 2008/0155782 | A1* | 7/2008 | Chang | G06F 1/1681 |
| | | | | 16/224 |
| 2009/0009950 | A1* | 1/2009 | Hattori | G06F 1/1681 |
| | | | | 361/679.27 |
| 2011/0047753 | A1* | 3/2011 | Yeh | G06F 1/162 |
| | | | | 16/342 |

* cited by examiner

ROTATING MECHANISM AND ELECTRONIC DEVICE INCLUDING THE SAME

BACKGROUND OF THE INVENTION

Field of the Invention

The present invention relates to a rotating mechanism and an electronic device including the same, and more particularly to a rotating mechanism including a positioning structure and an electronic device including the same.

Description of the Prior Art

Current conventional rotating mechanisms are mostly used to connect two electronic modules. In addition to having relative rotation movement, the two electronic modules connected further include wires therebetween for transmitting electronic signals. In addition, a hollow part of a shaft is for wires to pass through.

However, a rotating mechanism needs to include multiple plate members such as a positioning piece, a limiting piece and a mounting bracket stacked in an axial direction, and these plate members stacked in the axial direction need to be fixed by a coaxial locking member. Thus, the above structural configuration inevitably results in issues that the overall thickness of the conventional rotating mechanism in the axial direction cannot be reduced, and that the conventional rotating mechanism cannot be suitably applied to small-sized electronic products satisfying user demands, for example, portable electronic devices.

SUMMARY OF THE INVENTION

It is an object of the present invention to provide a rotating mechanism and an electronic device including the same so as to reduce the overall thickness of the rotating mechanism in an axial direction.

A rotating mechanism disclosed according to an embodiment of the present invention includes a first mount, a second mount, a first engagement component and a positioning assembly. The first mount has a shaft hole. The second mount includes a mounting part and a shaft part. The shaft part protrudes from the mounting part. The shaft part passes through the shaft hole so that the second mount is rotatable relative to the first mount. The first engagement component is fixed to the second mount so that the first engagement component rotates relative to the first mount along with the second mount, and the first engagement component is located on one side of the first mount away from the mounting part of the second mount. The positioning assembly includes a first positioning structure and a second positioning structure. The first positioning structure is disposed on the first mount. The second positioning structure is disposed on the first engagement component. The first positioning structure and the second positioning structure are matching recess and protrusion that are engaged with each other so as to position the first mount and the second mount.

A rotating mechanism disclosed according to another embodiment of the present invention includes a first mount, a second mount, a first engagement component, a positioning assembly and a fastener. The first mount has a shaft hole. The second mount includes a mounting part and a shaft part. The shaft part protrudes from the mounting part and passes through the shaft hole. The first engagement component is fixed on the second mount and rotates relative to the first mount along with the second mount, and the first engagement component is located a one side of the first mount away from the mounting part of the second mount. The positioning component includes a first positioning structure and a second positioning structure. The first positioning structure is disposed on the first mount. The second positioning structure is disposed on the first engagement component. The first positioning structure and the second positioning structure are matching recess and protrusion that are engaged with each other so as to position the first mount and the second mount. The fastener is fixed on the first engagement component and the mounting part of the second mount, and the fastener and the shaft part are non-coaxial.

An electronic device disclosed according to yet another embodiment of the present invention includes a first housing, a second housing and a rotating mechanism. The second housing is disposed relative to the first housing. The rotating mechanism is pivotally disposed between the first housing and the second housing. The rotating mechanism includes a first mount, a second mount, a first engagement component and a positioning assembly. The first mount has a shaft hole. The second mount includes a mounting part and a shaft part. The shaft part protrudes from the mounting part. The shaft part passes through the shaft hole so that the second mount is rotatable relative to the first mount. The first engagement component is fixed to the second mount and rotates relative to the first mount along with the second mount, and the first engagement component is located on a side of the first mount away from the mounting part of the second mount. The positioning assembly includes a first positioning structure and a second positioning structure. The first positioning structure is disposed on the first mount. The second positioning structure is disposed on the first engagement component. The first positioning structure and the second positioning structure are matching recess and protrusion that are engaged with each other so as to position the first mount and the second mount.

In the rotating mechanism and the electronic device according to the described embodiments, the first positioning structure is disposed on the first mount, and the second positioning structure is disposed on the first engagement component rotatable along with the second mount; therefore, the rotating mechanism does not require any additional positioning pieces. That is to say, the rotating mechanism disposes the positioning structure, which is originally disposed on a positioning piece, on the first engagement component, hence omitting the positioning piece. Thus, the number of structures stacked in an axial direction may be decreased, further reducing the overall thickness of the rotating mechanism in the axial direction.

Moreover, since the fastener and the shaft part of the second mount are non-coaxial, the first engagement component and the second mount do not require axially extending thread structures that achieve a certain locking force to fix to the fastener. As such, the fastener does not protrude by a significant distance from one side of the first engagement component away from the second mount and hence does not occupy an additional space in the axial direction, further reducing the overall thickness of the rotating mechanism in the axial direction.

DETAILED DESCRIPTION OF THE EMBODIMENTS

Detailed features and advantages of the embodiments of the present invention are given in the implementation examples in detailed below. The disclosure is sufficient for a person skilled in the art to understand the technical contents of the embodiments of the present invention and carry out implementation accordingly. Moreover, according to the detailed description, claims and drawings disclosed by the application, a person skilled in the art would be able to easily understand the related objects and advantages of the present invention. The embodiments are for illustrating the aspects of the present invention in detail, and are not to be construed as limitations to the present invention from any aspect.

Figure 1:
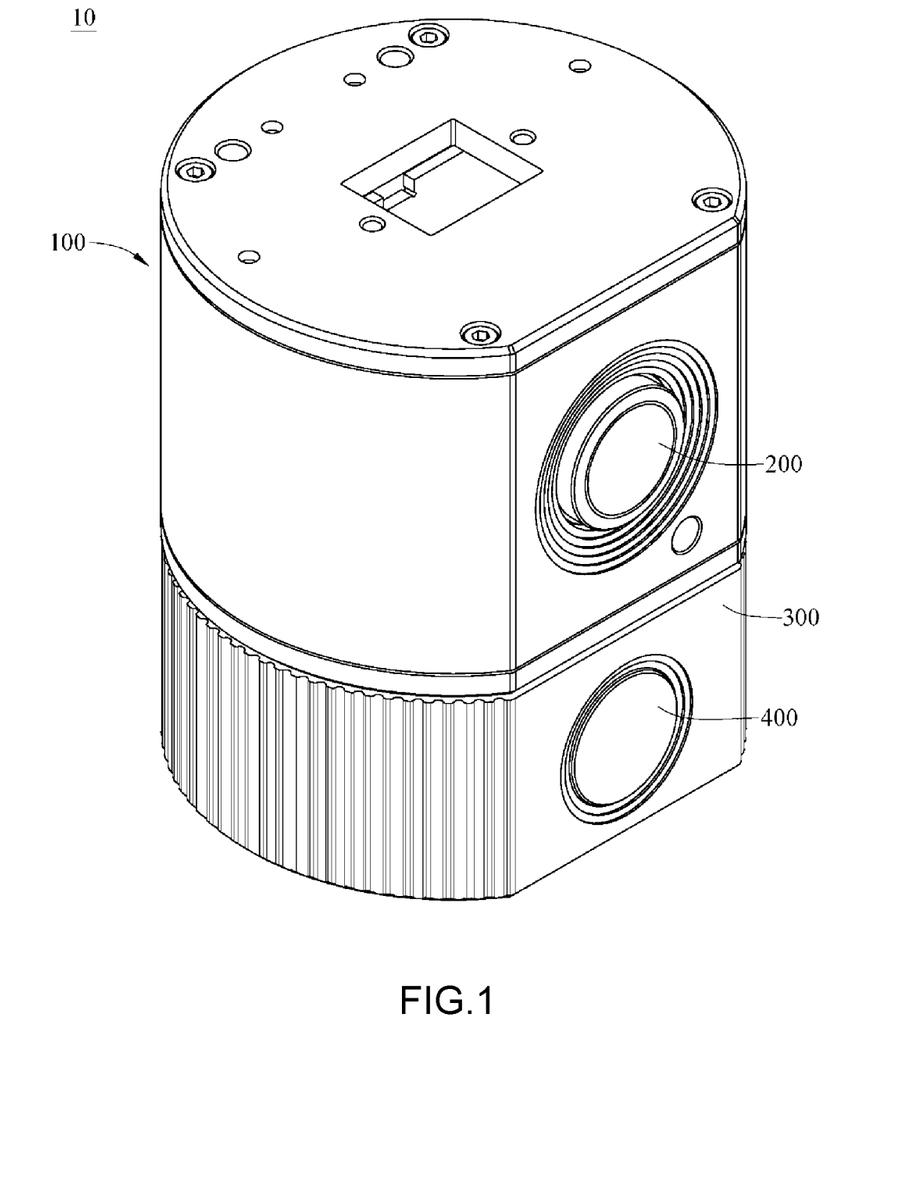
FIG. 1 is a three-dimensional diagram of an electronic device according to an embodiment of the present invention.
Figure 2:
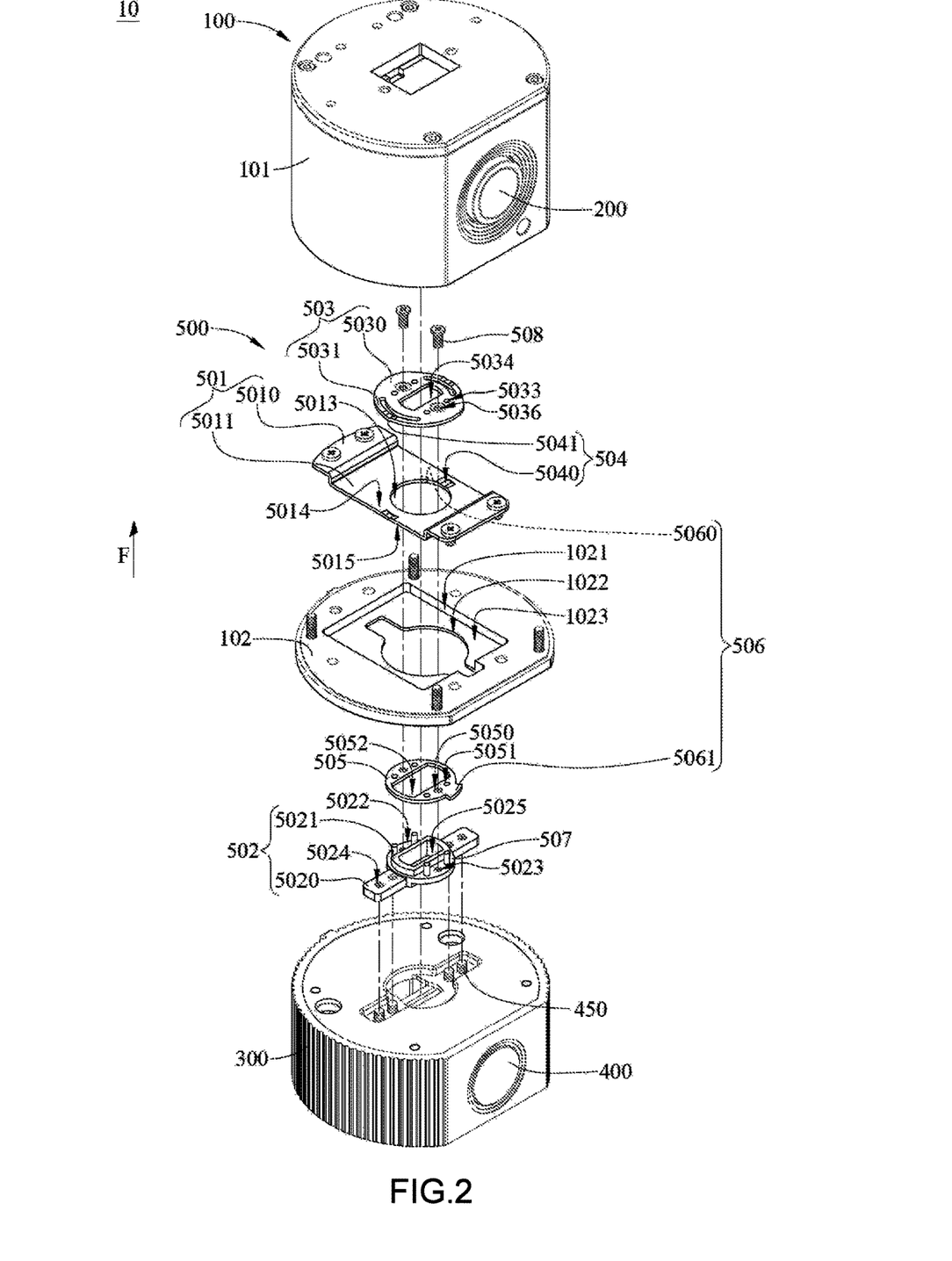
FIG. 2 is an exploded diagram of the electronic device in FIG. 1.

Refer to FIG. 1 and FIG. 2. FIG. 1 shows a three-dimensional diagram of an electronic device according to an embodiment of the present invention. FIG. 2 shows an exploded diagram of the electronic device in FIG. 1

In this embodiment, an electronic device 10 includes a first housing 100, a first lens module 200, a second housing 300, a second lens module 400, a plurality of fasteners 450 and a rotating mechanism 500.

The first housing 100 includes a first body 101 and a plate member 102. The plate member 102 is locked on one side of the first body 101, and has a receiving slot 1021 and a shaft hole 1022 in communication with each other. The receiving slot 1021 is located on one side of the plate member 102 near the first body 101, and the shaft hole 1022 is located on one side of the plate member 102 away from the first body 101. Moreover, the plate member 102 further has a slot bottom surface 102, and the shaft hole 1022 is located on the slot bottom surface 1023. The first lens module 200 is disposed in the first body 101 of the first housing 100. The second housing 300 is opposite to the first housing 100. The fasteners 450 are, for example, screws and are locked on the second housing 300. The second lens module 400 is disposed in the second housing 300.

It should be noted that, the first housing 100 is not limited to necessarily including the plate member 102. In other embodiments, the first housing does not need to include the plate member 102.

The rotating mechanism 500 is pivotally disposed between the first housing 100 and the second housing 300, so that the first housing 100 is opposite to the second housing 300 and the first housing 100 is rotatable relative to the second housing 300. Details of the rotating mechanism 500 pivotally disposed between the first housing 100 and the second housing 300 are to be given below.

Figure 3:
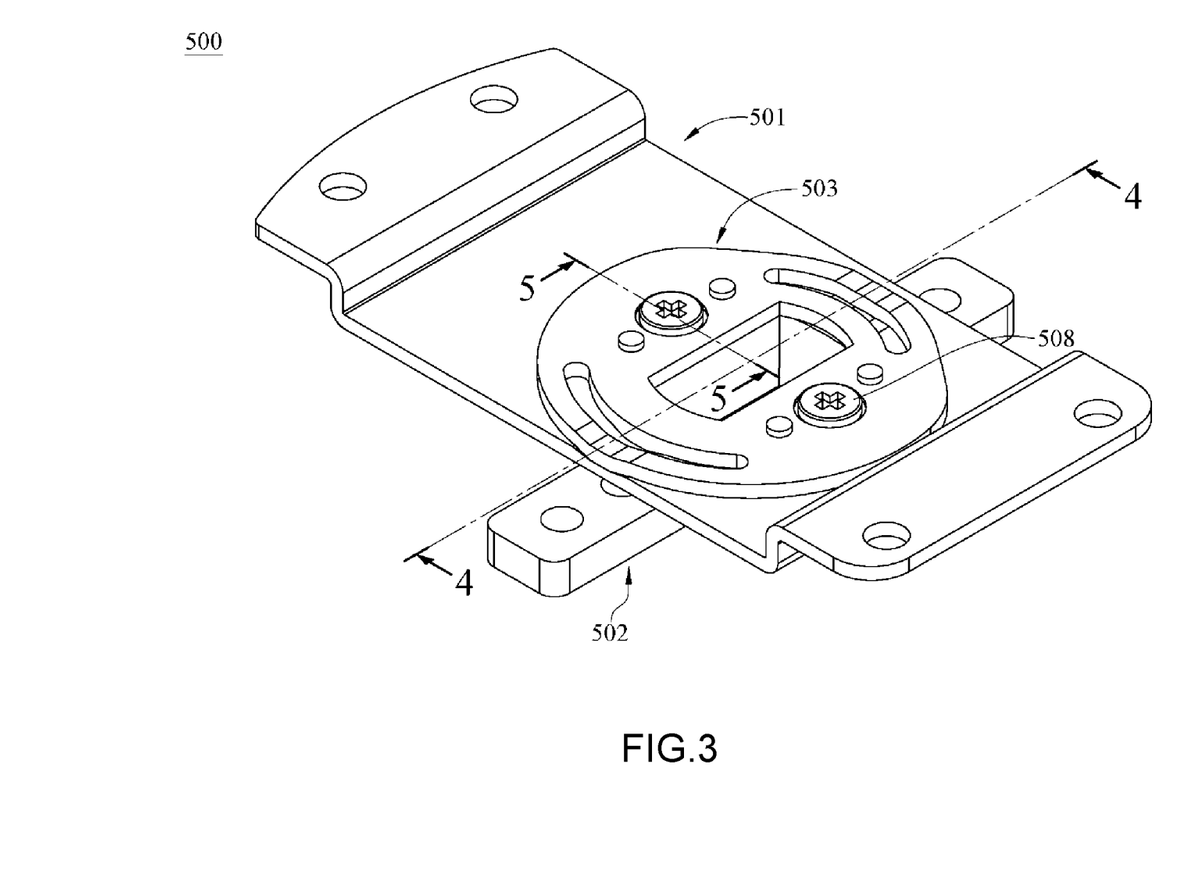
FIG. 3 is a three-dimensional diagram of a rotating mechanism of the electronic device in FIG. 1.
Figure 4:
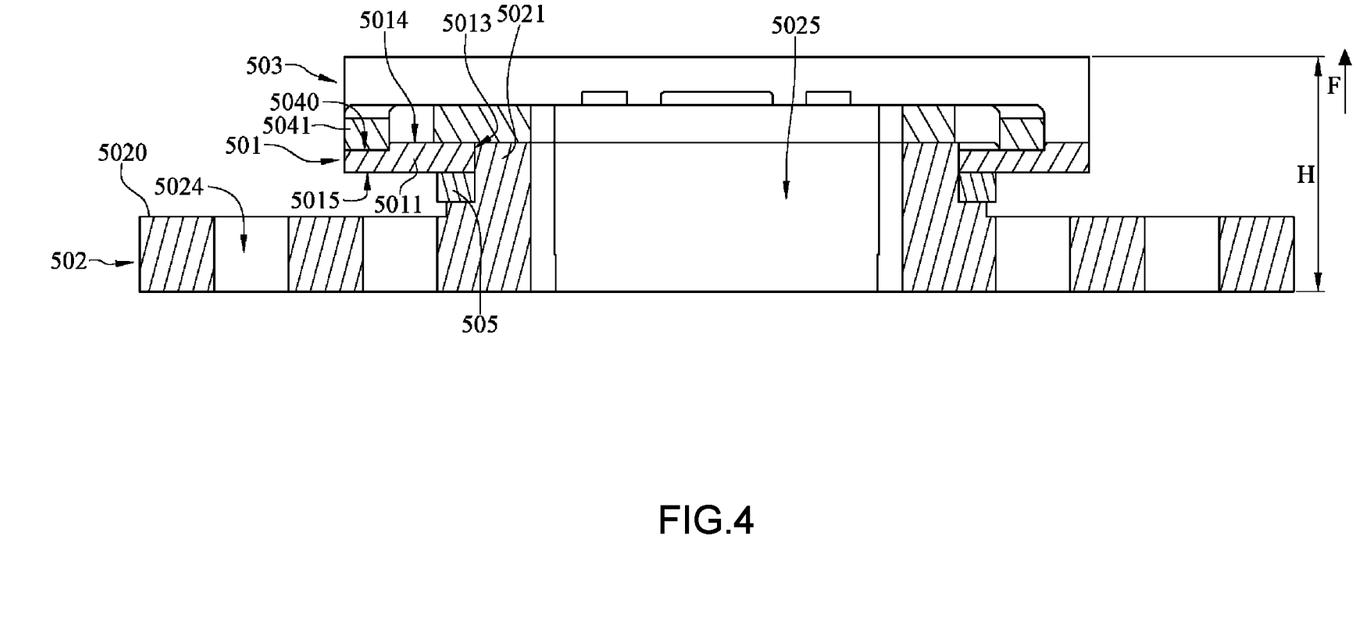
FIG. 4 is a section schematic diagram of the rotating mechanism of the electronic device in FIG. 3 along the section line 4-4.
Figure 5:
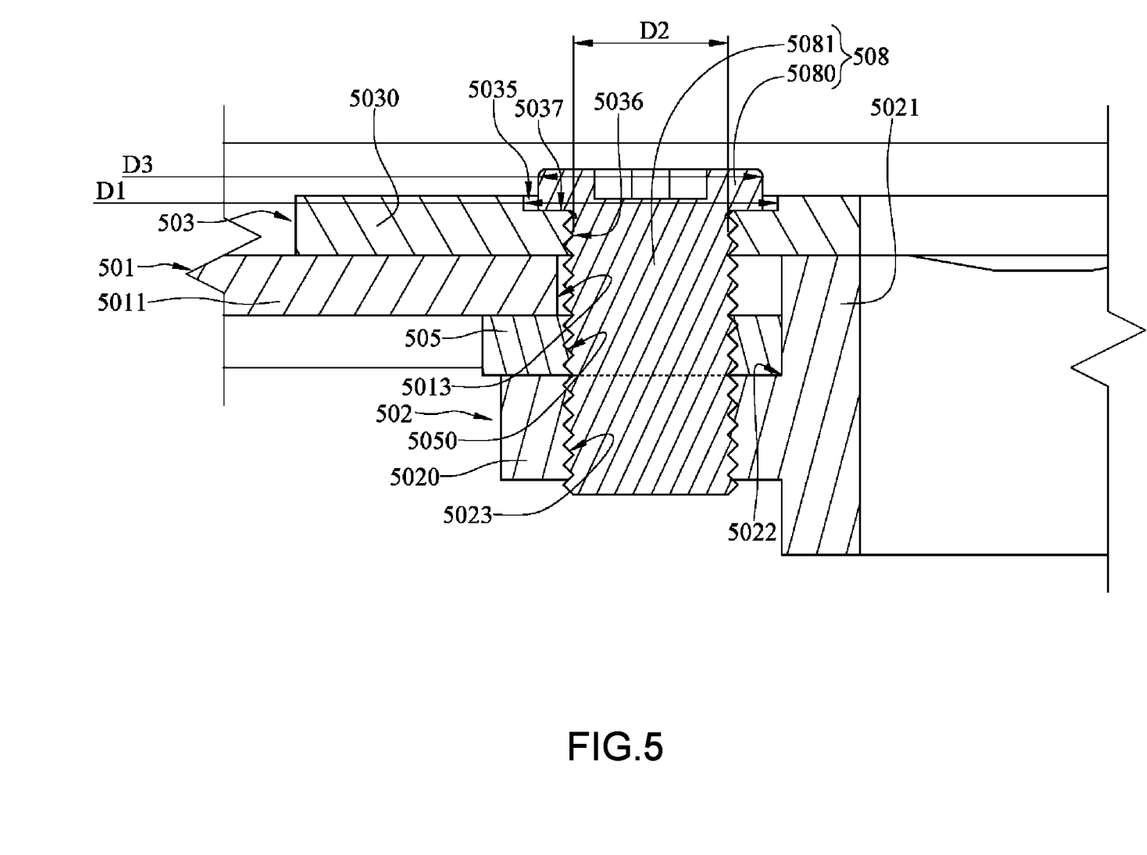
FIG. 5 is an enlarged partial diagram of a section schematic diagram of the rotating mechanism of the electronic device in FIG. 3 along the section line 5-5.

Refer to FIG. 2 to FIG. 5. FIG. 3 shows a three-dimensional diagram of a rotating mechanism of the electronic device in FIG. 1. FIG. 4 shows a section schematic diagram of the rotating mechanism of the electronic device in FIG. 3 along the section line 4-4. FIG. 5 shows an enlarged partial diagram of a cross section diagram of the rotating mechanism of the electronic device in FIG. 3 along the section line 5-5. In this embodiment, the rotating mechanism 500 includes a first mount 501, a second mount 502, a first engagement component 503, a positioning assembly 504, a second engagement component 505, a limiting assembly 506, a plurality of second positioning columns 507 and two fasteners 508.

The first mount 501 is fixed on one side of the plate member 102 close to the first body 101. The second mount 502 is fixed on one side of the second housing 300 close to the first body 101, and is rotatably disposed on the first mount 501. The first engagement component 503 is located on one side of the first mount 501 away from the plate member 102, and the first engagement component 503 and the plate member 102 jointly sandwich the first mount 501. Moreover, the first engagement component 503 is fixed on the second mount 502 by the positioning columns 507 and the fasteners 508, and rotates relative to the first mount 501 along with the second mount 502. The second engagement component 505 is fixed on the second mount 502 also by the positioning columns 507 and the fasteners 508, and is located on one side of the first mount 501 away from the first engagement component 503.

The first mount 501 is formed by, for example, sheet metal stamping. The sheet steel thickness of the first mount 501 is, for example, 0.8 mm. In this embodiment, the first mount 501 includes two fixing parts 5010 and one installation part 5011. The installation part 1011 has a first surface 5014, a second surface 5015 and a shaft hole 5013. The first surface 5014 and the second surface 5015 are opposite to each other. The shaft hole 5013 passes through the first surface 5014 and the second surface 5015. The installation part 5011 is accommodated in the receiving slot 1021 of the plate member 102, and the second surface 5015 leans against the slot bottom surface 1023 of the plate member 102. The two fixing parts 5010 protrude from two opposite sides of the installation part 5011, respectively, and are fixed on the plate member 102.

The second mount 502 is formed by, for example, casting, because of its more complicated shape. Moreover, the second mount 502 is made of, for example, zinc alloy. In this embodiment, the second mount 502 includes a mounting part 5020 and a shaft part 5021. The mounting part 5020 has two first locking holes 5023 and a plurality of second locking holes 5024. The two first locking holes 5023 are separate from the second locking holes 5024. The fasteners 450 are respectively locked in the second locking holes 5024 of the mounting part 5020, so as to fix the mounting part 5020 on one side of the second housing 300 close to the first body 101. The shaft part 5021 axially protrudes from the mounting part 5020. The shaft part 5021 passes through the shaft hole 5013 of the installation part 5011 of the first mount 501, so that the second mount 502 is rotatable relative to the first mount 501. Moreover, the shaft part 5021 is located in the shaft hole 1022 of the plate member 102. Further, in this embodiment, the shaft part 5021 has two notches 5022. Further, the second mount 502 has an opening 5025. The opening 5025 passes through the mounting part 5020 and the shaft part 5021.

In addition, as shown in FIG. 4, one side of the shaft part 5021 of the second mount 502 away from the mounting part 5020 is, for example but not limited to, leveled with the first surface 5014. In other embodiments, one side of the shaft part of the second mount away from the mounting part may also be between the first surface and the second surface of the installation part of the first mount.

Referring to FIG. 2 to FIG. 5, the first engagement component 503 is formed by, for example, steel sheet stamping. Moreover, the steel sheet thickness of the first engagement component 503 is, for example, 0.8 mm. In this embodiment, the first engagement component 503 includes an establishment part 5030 and two elastic arms 5031. The establishment part 5030 of the first engagement component 503 is located on one side of the installation part 5011 of the first mount 501 away from the mounting part 5020 of the second mount 502. Further, the establishment part 5030 of the first engagement component 503 and the slot bottom surface 1023 of the plate member 102 jointly sandwich the installation part 5011 of the first mount 501. Moreover, in this embodiment, the establishment part 5030 of the first engagement component 503 has two locking holes 5036, two accommodating slots 5035, a plurality of positioning holes 5033 and a through aperture 5034. The two locking holes 5036, the positioning holes 5033 and the through aperture 5034 are separate from one another, and the two locking holes 5036 are respectively in communication with the two accommodating slots 5035. In this embodiment, referring to FIG. 5, the locking holes 5036 are locate on one side of the establishment part 5030 of the first engagement component 503 close to the installation part 5011 of the first mount 501, and the accommodating slots 5035 are located on one side of the establishment part 5030 of the first engagement component 503 away from the installation part 5011 of the first mount 501. Further, a diameter D1 of the accommodating slots 5035 is greater than a diameter D2 of the locking holes 5036. The two elastic arms 5031 are connected to two opposite sides of the establishment part 5030, respectively.

The positioning assembly 504 includes two first positioning structures 5040 and two second positioning structures 5041. The first positioning structures 5040 and the second positioning structures 5041 are matching recesses and protrusions that are mutually engaged. More specifically, in this embodiment, each first positioning structure 5040 is a positioning recess and each second positioning structure 5041 is a positioning protrusion. Moreover, the two first positioning structures 5040 are integrally disposed on one side of the installation part 5011 of the first mount 501 away from the mounting part 5020 of the second mount 502. The two second positioning structures 5041 are integrally formed on one side of the two elastic arms 5031 of the first engagement component 503 close to the mounting part 5020 of the second mount 502.

However, the present invention does not specifically limit the numbers of the first positioning structure 5040 and the second positioning structure 5041. In other embodiment, the positioning assembly may also include only one first positioning structure and one second positioning structure; in the embodiment where the positioning assembly includes only one first positioning structure and one second positioning structure, the first engagement component needs to include only one elastic arm.

In addition, the first positioning structures 5040 are not limited to being integrally formed on the installation part 5011, and the second positioning structures 5041 are not limited to being integrally formed on the two elastic arms 5031, respectively. In other embodiments, the first positioning structures may also be disposed on the installation part by fasteners, and the second positioning structures may also be disposed on the two elastic arms by two fasteners, respectively.

Moreover, the first positioning structures 5040 and second positioning structures 5041 are not limited to being positioning recesses and positioning protrusions, respectively. In other embodiments, the first positioning structures and the second positioning structures may also be positioning protrusions and positioning recesses, respectively.

Further, the two second positioning structures 5041 are not limited to being disposed on one side of the elastic arms 5031 close to the mounting part 5020 of the second mount 502. In other embodiments, given the second positioning structures may be engaged with the first positioning structures, the second positioning structures may be disposed on one side of the elastic arms away from the mounting part of the second mount, or be disposed on any other appropriate positions.

The second engagement component 505 is formed by, for example, steel sheet stamping. Moreover, the steel sheet thickness of the second engagement component 505 is, for example, 0.8 mm. In this embodiment, the second engagement component 505 has two locking holes 5050, a plurality of positioning holes 5051 and an engagement hole 5052. The two locking holes 5050, the positioning holes 5051 and the engagement hole 5052 are separate from one another. Further, the shaft part 5014 of the second mount 502 is engaged in the engagement hole 5052 of the second engagement component 505 by means of packing, such that the second engagement component 505 is between the installation part 5011 of the first mount 501 and the mounting part 5020 of the second mount 502.

The limiting assembly 506 includes a first limiting structure 5060 and a second limiting structure 5061. In this embodiment, the first limiting structure 5060 is, for example, an integral that axially protrudes from one side of the installation part 5011 of the first mount 501 close to the second mount 502. In this embodiment, the second limiting structure 5061 is, for example, an integral that radially protrudes from the second engagement component 505. The second limiting structure 5061 is limited by the first limiting structure 5060 so as to limit a rotation angle of the second mount 502 relative to the first mount 501.

Moreover, in this embodiment, because the second limiting structure 5061 is integrally disposed on the second engagement component 505 and the second mount 502 is a structure independent from the second limiting structure 5061 and the second engagement component 505, the materials for forming the second limiting structure 5061 and the second engagement component 505 may be different from that for forming the second mount 502. As such, by means of material selection, the hardness of the second limiting structure 5061 and the second engagement component 505 may be greater than that of the second mount 502, thereby improving the durability of the second limiting structure 5061 and the second engagement component 505. However, the present invention is not limited to the above examples. In other embodiments, the hardness of the second limiting structure and the second engagement component may also be smaller than or equal to that of the second mount.

Further, in other embodiments, the first limiting structure may also be disposed on the installation part of the first mount by a fastener, and the second limiting structure may also be disposed on the second engagement component by a fastener. In the above configuration, by means of material selection, the hardness of the second limiting structure and the second engagement component may also be greater than that of the second mount.

However, the rotating mechanism 500 is not limited to necessarily including the second engagement component. In other embodiments, the rotating mechanism may also exclude the second engagement component so as to decrease the number of structures stacked in the axial direction, further reducing the overall thickness of the rotating mechanism in the axial direction. Moreover, in an embodiment where the rotating mechanism does not include the second engagement component, the second limiting structure may be disposed on the mounting part of the second mount instead. Alternatively, in an embodiment where the rotating mechanism does not include the second engagement component, the second limiting structure may also be disposed on one side of the first engagement component near the first mount, and the first limiting structure may be disposed on one side of the first mount away from the second mount instead. Further, the rotating mechanism 500 is not limited to necessarily including the limiting assembly. In other embodiments, the rotating mechanism does not need to include the second engagement component and the limiting assembly.

It should be noted that, the through aperture 5034 of the establishment part 5030 of the first engagement component 503 and the opening 5025 of the second mount 502 are, for example, for a cable (not shown) electrically connecting the first lens module 200 and the second lens module 400 to pass through.

The second positioning columns 507 integrally and axially protrude from one side of the mounting part 5020 of the second mount 502 close to the first mount 501, and are respectively located in the two notches 5022 of the shaft part 5021. The second positioning columns 507 respectively pass through the positioning holes 5033 of the establishment part 5030 of the first engagement component 503 and the positioning holes 5051 of the second engagement component 505, so as to position the second mount 502, the first engagement component 503 and the second engagement component 505 together.

However, the rotating mechanism 500 is not limited to necessarily including a plurality of second positioning columns 507. In other embodiments, the rotating mechanism may include only one second positioning column 507. In yet other embodiments, the rotating mechanism does not need to include any second positioning column 507.

For illustration purposes, the structure and connection of only one fastener 508 is given below. Referring to FIG. 2 and FIG. 5, the fastener 508 is, for example, a screw, and includes a head 5080 and a body 5081 connected to each other. A diameter D3 of the head 5080 is smaller than the diameter D1 of the accommodating slots 5035 of the establishment part 5030 of the first engagement component 503 and is greater than the diameter D2 of the locking holes 5036 of the establishment part 5030 of the first engagement component 503. Further, in this embodiment, the establishment part 5030 of the first engagement component 503 further has a slot bottom surface 5037. The locking holes 5036 are located on the slot bottom surface 5037. One side of the head 5080 close to the body 5081 leans against the slot bottom surface 5037. The body 5081 is locked in the locking holes 5036 of the establishment part 5030 of the first engagement component 503, the locking holes 5050 of the second engagement component 505 and the first locking holes 5023 of the mounting part 5020 of the second mount 502. That is to say, the fastener 508 fixes the first engagement component 503, the second engagement component 505 and the second mount 502 together. Further, the body 5081 is located in the notches 5022 of the shaft part 5021 of the second mount 502 so as to be close to the shaft part 5021 of the second mount 502. In addition, the body 5081 of the fastener 508 and the shaft part 5021 of the second mount 502 are together located in, for example but not limited to, the shaft hole 5013 of the installation part 5011 of the first mount 501. In other embodiments, additional locking holes separate from the shaft hole may also be provided on the installation part of the first mount for the body of the fastener to pass through, such that the body and the shaft part are not together located in the shaft hole. Further, in this embodiment, the fastener 508 and the shaft part 5021 of the second mount 502 are, for example but not limited to, non-coaxial. In other embodiments, the fastener and the shaft part of the second mount may also be coaxial.

As shown in FIG. 4, in this embodiment, an overall thickness H of the rotating mechanism 500 in an axial direction F is, for example, less than or equal to 5 mm.

Because the first engagement component 503 is fixed on the second mount 502 and rotates relative to the first mount 501 along with the second mount 502, the first positioning structures 5040 and the second positioning structures 5041 further position the first mount 501 and the second mount 502 by positioning the first engagement component 503 and the first mount 501.

Moreover, the second positioning columns 507 position the second mount 502, the first engagement component 503 and the second engagement component 505 together, such that the fastener 508 is allowed to be more conveniently locked on the first mount 502, the first engagement component 503 and the second engagement component 505.

The rotating mechanism 500 is not limited to necessarily including the fasteners 508. In other embodiments, the rotating mechanism 500 may also exclude the fasteners, and fix the second mount, the first engagement component and the second engagement component by means of stamping instead.

In this embodiment, the electronic device 10 is, for example, an electronic device having an image capturing function and using double lens modules, thereby realizing functions such as ranging, optical zoom, dark light effect enhancement, three-dimensional capturing and three-dimensional modeling. The first lens module 200 disposed in the first housing 100 and the second lens module 400 disposed in the second housing 300 are rotatably disposed using the rotating mechanism 500, so as to readily adjust the capturing ranges of the two lens modules. In another embodiment, the electronic device 10 is, for example, an in-vehicle recorder or other electronic devices having an image capturing function, and the rotating mechanism 500 is, for example, a rotating shaft connecting a camera lens and a key, and a user may rotate the camera lens using the rotating mechanism 500. In other embodiments, the electronic device 10 is, for example, a laptop computer, and the rotating mechanism 500 is, for example, a rotating shaft between a display and a keyboard. It should be noted that the present invention is not limited to the above examples.

In the rotating mechanism and the electronic device according to the described embodiments, the first positioning structure is disposed on the first mount, and the second positioning structure is disposed on the first engagement component rotatable along with the second mount; therefore, the rotating mechanism does not require any additional positioning pieces. That is to say, the rotating mechanism disposes the positioning structure, which is originally disposed on a positioning piece, on the first engagement component, hence omitting the positioning piece. Thus, the number of structures stacked in an axial direction may be decreased, further reducing the overall thickness of the rotating mechanism in the axial direction.

Further, because the first positioning structures are integrally connected to the first mount, and the second positioning structures are integrally connected to the first engagement component, the first mount and the first engagement component may be stacked in a more compact manner in the axial direction. As such, the overall thickness of the rotating mechanism in the axial direction is further reduced to a size of as small as 5 mm or less.

Moreover, since the fastener and the shaft part of the second mount are non-coaxial, the first engagement component and the second mount do not require axially extending thread structures that achieve a certain locking force to fix to the fastener. As such, the fastener does not protrude by a significant distance from one side of the first engagement component away from the second mount and hence does not occupy an additional space in the axial direction, further reducing the overall thickness of the rotating mechanism in the axial direction.

In addition, because the heads of the fasteners are accommodated in the accommodating slots of the establishment part of the first engagement component and lean against the slot bottom surface of the establishment part of the first engagement component, the heads of the fasteners are partially embedded in the establishment part of the first engagement component. Thus, the distance of the fasteners protruding from one side of the first engagement component away from the second mount may be decreased, further reducing the overall thickness of the rotating mechanism in the axial direction.

While the invention has been described by way of example and in terms of the embodiments, it is to be understood that the invention is not limited thereto. Changes and modifications may be made by a person skilled in the art without departing from the spirit and scope of the present invention. Therefore, the scope of the appended claims of the invention should be accorded with the broadest interpretation of the appended claims of the application.

What is claimed is:

1. A rotating mechanism, comprising:
    a first mount, having a shaft hole;
    a second mount, comprising a mounting part and a shaft part, the shaft part protruding from the mounting part and passing through the shaft hole;
    a first engagement component, fixed on the second mount and allowed to rotate relative to the first mount along with the second mount, the first engagement component being located on one side of the first mount away from the mounting part of the second mount;
    a positioning assembly, comprising a first positioning structure and a second positioning structure, the first positioning structure being disposed on the first mount, the second positioning structure being disposed on the first engagement component, the first positioning structure and the second positioning structure being matching recess and protrusion that are engaged with each other so as to position the first mount and the second mount; and
    a fastener, fixed on the first engagement component and the mounting part of the second mount, the fastener and the shaft part being non-coaxial.

2. The rotating mechanism according to claim 1, wherein the first positioning structure is a positioning recess and the second positioning structure is a positioning protrusion.

3. The rotating mechanism according to claim 2, wherein the first engagement component comprises an establishment part and an elastic arm, the elastic arm is connected to the establishment part, and the second positioning structure protrudes from one side of the elastic arm close to the mounting part of the second mount.

4. The rotating mechanism according to claim 1, further comprising:
    a limiting assembly, comprising a first limiting structure and a second limiting structure, the first limiting structure being disposed on the first mount, the second limiting structure being disposed on the mounting part of the second mount, the second limiting structure being limited by the first limiting structure so as to limit a rotation angle of the second mount relative to the first mount.

5. The rotating mechanism according to claim 1, further comprising:
    a limiting assembly, comprising a first limiting structure and a second limiting structure, the first limiting structure being disposed on the first mount, the second limiting structure being disposed on the first engagement component, the second limiting structure being limited by the first limiting structure so as to limit a rotation angle of the second mount relative to the first mount.

6. The rotating mechanism according to claim 1, further comprising:
    a second engagement component and a limiting assembly, the second engagement component being fixed on the second mount and allowed to rotate relative to the first mount along with the second mount, the limiting assembly comprising a first limiting structure and a second limiting structure, the first limiting structure being disposed on the first mount, the second limiting structure being disposed on the second engagement component, the second limiting structure being limited by the first limiting structure so as to limit a rotation angle of the second mount relative to the first mount.

7. The rotating mechanism according to claim 6, wherein hardness of the second limiting structure and the second engagement component is greater than hardness of the second mount.

8. The rotating mechanism according to claim 6, wherein the second engagement component is between the first mount and the mounting part of the second mount, and the first limiting structure is located on one side of the first mount close to the mounting part of the second mount.

9. The rotating mechanism according to claim 1, further comprising:
    a positioning column;
    wherein, the first engagement component has a positioning hole, the positioning column is disposed on the second mount and passes through the positioning hole so as to position the first engagement component and the second mount.

10. The rotating mechanism according to claim 1, wherein the first mount has a first surface and a second surface opposite to each other, the shaft hole passes through the first surface and the second surface, the first surface is farther away from the mounting part of the second mount than the second surface, and one side of the shaft part of the second mount away from the mounting part is between the first surface and the second surface or is leveled with the first surface.

11. The rotating mechanism according to claim 10, further comprising:
    a positioning column;
    wherein, the first engagement component has a positioning hole, the positioning column is disposed on the second mount and passes through the positioning hole so as to position the first engagement component and the second mount.

12. The rotating mechanism according to claim 1, wherein the fastener is near the shaft part of the second mount, and the fastener and the shaft part of the second mount are together located in the shaft hole of the first mount.

13. The rotating mechanism according to claim 1, wherein the second mount is rotatable relative to the first mount.

14. An electronic device, comprising:

a first housing;

a second housing, being relative to the first housing; and a rotating mechanism, pivotally disposed between the first housing and the second housing, the rotating mechanism comprising:

a first mount, having a shaft hole;

a second mount, comprising a mounting part and a shaft part, the shaft part protruding from the mounting part, the shaft part passing through the shaft hole to so that the second mount is rotatable relative to the first mount;

a first engagement component, fixed on the second mount and allowed to rotate relative to the first mount along with the second mount, the first engagement component being located on one side of the first mount away from the mounting part of the second mount;

a positioning assembly, comprising a first positioning structure and a second positioning structure, the first positioning structure being disposed on the first mount, the second positioning structure being disposed on the first engagement component, the first positioning structure and the second positioning structure being matching recess and protrusion that are engaged with each other so as to position the first mount and the second mount; and a fastener, fixed on the first engagement component and the mounting part of the second mount, the fastener and the shaft part being non-coaxial.

15. The electronic device according to claim 14, wherein the first mount is disposed on the first housing, and the second mount is disposed on the second housing.

16. The electronic device according to claim 14, wherein the first housing further comprises a plate member, the first mount is disposed on the plate member, and the plate member is between the first mount and the second mount.

17. A rotating mechanism, comprising:

a first mount, having a shaft hole;

a second mount, comprising a mounting part and a shaft part, the shaft part protruding from the mounting part, the shaft part passing through the shaft hole so that the second mount is rotatable relative to the first mount;

a first engagement component, fixed on the second mount and allowed to rotate relative to the first mount along with the second mount, the first engagement component being located on one side of the first mount away from the mounting part of the second mount; and a fastener, fixed on the first engagement component and the mounting part of the second mount, the fastener and the shaft part being non-coaxial, wherein the first mount and the first engagement component are engaged with each other so as to position the first mount and the second mount.

18. The rotating mechanism according to claim 17, further comprising:

a positioning assembly, comprising a first positioning structure and a second positioning structure, wherein the first positioning structure is disposed on the first mount, the second positioning structure is disposed on the first engagement component, and the first positioning structure is a positioning recess and the second positioning structure is a positioning protrusion.

19. The rotating mechanism according to claim 17, further comprising:

a limiting assembly, comprising a first limiting structure and a second limiting structure, the first limiting structure being disposed on the first mount, the second limiting structure being disposed on the first engagement component or the mounting part of the second mount, the second limiting structure being limited by the first limiting structure so as to limit a rotation angle of the second mount relative to the first mount.

20. The rotating mechanism according to claim 17, wherein the first mount has a first surface and a second surface opposite to each other, the shaft hole passes through the first surface and the second surface, the first surface is farther away from the mounting part of the second mount than the second surface, and one side of the shaft part of the second mount away from the mounting part is between the first surface and the second surface or is leveled with the first surface.

* * * * *